(12) United States Patent
Caillot et al.

(10) Patent No.: US 9,963,113 B2
(45) Date of Patent: May 8, 2018

(54) WINDSCREEN WIPER BLADE WITH AGEING MEMBER

(71) Applicant: Valeo Systèmes d'Essuyage, Le Mesnil Saint Denis (FR)

(72) Inventors: Gérald Caillot, Cernay la Ville (FR); Frédéric Giraud, Le Perray en Yvelines (FR); Pierre Sevellec, Cournon (FR); Olivier Raby, Paris (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 249 days.

(21) Appl. No.: 14/784,836

(22) PCT Filed: Apr. 16, 2014

(86) PCT No.: PCT/EP2014/057798
§ 371 (c)(1),
(2) Date: Oct. 15, 2015

(87) PCT Pub. No.: WO2014/170396
PCT Pub. Date: Oct. 23, 2014

(65) Prior Publication Data
US 2016/0082928 A1 Mar. 24, 2016

(30) Foreign Application Priority Data
Apr. 18, 2013 (FR) ...................................... 13 53522

(51) Int. Cl.
*B60S 1/38* (2006.01)
(52) U.S. Cl.
CPC ......... *B60S 1/38* (2013.01); *B60S 2001/3844* (2013.01)

(58) Field of Classification Search
CPC ................................................ B60S 2001/3844
USPC .............................. 116/200–337; 15/250.001
See application file for complete search history.

(56) References Cited

U.S. PATENT DOCUMENTS

| 4,987,849 A | 1/1991 | Sherman |
| 5,349,718 A | 9/1994 | Gibbon |
| 6,775,877 B1 * | 8/2004 | Broszniowski ....... B60S 1/3801 116/200 |

(Continued)

FOREIGN PATENT DOCUMENTS

| CN | 102077060 A | 5/2011 |
| CN | 102592206 A | 7/2012 |

(Continued)

OTHER PUBLICATIONS

FR2843083A1 (machine translation), 2004.*

(Continued)

*Primary Examiner* — Andrew A Horton
(74) *Attorney, Agent, or Firm* — Osha Liang LLP

(57) ABSTRACT

Windscreen wiper blade intended to be hinged to an actuating arm of a wiper system, this blade comprising: a member referred to as an ageing member able to change visual appearance over time; and at least one symbol (7) hidden by the ageing member, the symbol (7) becoming visible after the ageing member has changed in visual appearance, characterized in that the symbol (7) comprises at least one type of elementary pattern (70) the dimensions and/or relative layout of which code for information relating to the blade.

11 Claims, 3 Drawing Sheets

(56) References Cited

U.S. PATENT DOCUMENTS

| | | | | |
|---|---|---|---|---|
| 7,194,781 B1* | 3/2007 | Orjela | ................... | B60S 1/3801 |
| | | | | 116/200 |
| 2009/0301382 A1* | 12/2009 | Patel | ....................... | G01K 3/04 |
| | | | | 116/201 |
| 2010/0306950 A1* | 12/2010 | Beelen | ................... | B60S 1/381 |
| | | | | 15/250.201 |

FOREIGN PATENT DOCUMENTS

| | | |
|---|---|---|
| FR | 2 843 083 A1 | 2/2004 |
| TW | 262441 B | 11/1995 |
| WO | 03/101797 A1 | 12/2003 |

OTHER PUBLICATIONS

Office Action Issued in Corresponding Chinese Application No. 201480033097.4, dated Nov. 28, 2016 (17 Pages with English Translation).
International Search Report issued in PCT/EP2014/057798 dated May 14, 2014 (3 pages).
The Third Office Action issued in corresponding Chinese Patent application No. 201480033097.4, dated Feb. 9, 2018 (12 pages).

* cited by examiner

WINDSCREEN WIPER BLADE WITH AGEING MEMBER

The subject matter of the present invention is a windscreen wiper blade including a so-called ageing member.

It notably applies to a windscreen wiper blade articulated to an actuating arm of a motor vehicle windscreen wiper, the blade including a squeegee pressed against the window to be wiped.

The windscreen wiper blade is a component of the vehicle that is subject to wear and that must be replaced regularly in order to guarantee a quality of wiping making it possible to maintain satisfactory safety conditions during periods of use of the windscreen wiper.

The blade may become worn through friction but also because of the material constituting it being degraded by the action of an exterior agent such as ultraviolet radiation or oxygen.

Moreover, many motorists do not know or forget the date on which their windscreen wiper blades were last replaced and therefore are not aware of the state of ageing of their blades.

The applicant manufactures a motor vehicle windscreen wiper enabling motorists to determine in a simple manner the state of ageing of their windscreen wiper blades.

Thus, as shown in FIGS. 1 and 2, the blade 1 of the "Silencio" windscreen wiper 2 includes a so-called ageing member 3.

The member 3 includes:
a lower patch including an exclamation mark 4 inscribed inside a triangle;
an upper patch including an initially opaque, to be more specific black, photosensitive substance adapted to become transparent and to allow the exclamation mark 4 to be seen when it has absorbed a particular quantity of light.

The appearance of the exclamation mark 4 as a result of the modification of the properties of the upper patch enables the motorist to become aware that their windscreen wiper blade must be replaced.

However, it happens that the prior art ageing members only enable motorists to tell when it is necessary to replace the windscreen wiper blades including such ageing members. Many motorists are therefore unable to determine in particular the type and the point of sale of the replacement blade.

An object of the present invention is to remedy this drawback by proposing a windscreen wiper blade including a so-called ageing member enabling motorists to access information notably facilitating the determination of the type and the point of sale of the replacement windscreen wiper blade.

To this end, the present invention proposes a windscreen wiper blade including:
a so-called ageing member adapted to change visual appearance over time; and
at least one symbol hidden at least in part, preferably completely, by the ageing member,
wherein the symbol comprises at least one type of elementary pattern the dimensions and/or relative layout of which enable coding of information relating to the blade.

The symbol is advantageously rendered visible following a change in the visual appearance of the member.

This blade is notably intended to be articulated to an actuating arm of a windscreen wiping system.

Accordingly, using a device making it possible to decode said information, the motorist can determine the part number of the blade, for example, how to mount it and to demount it, and points of sale for the replacement blade. Said information may equally consist in an address of an Internet site providing information on the blade. The symbol therefore advantageously makes it possible to code a large amount of information.

The symbol is preferably chosen from barcodes.

Using barcodes advantageously makes it possible to generate them and to read them easily using known printing techniques and decoding devices, respectively.

The barcodes chosen for the symbol may notably but non-exclusively be one-dimensional (1D) barcodes or two-dimensional (2D) barcodes such as the QR (Quick Response) matrix code. The barcode is preferably a two-dimensional barcode.

Said information is preferably decoded by means of a device including an electronic sensor such as a barcode reader, a mobile telephone, a pocket terminal or a cyber camera.

The information can therefore and advantageously be decoded by means of known and widely circulated devices.

In accordance with a variant embodiment of the invention, the ageing member includes said symbol.

In accordance with another variant embodiment of the invention, the ageing member includes the symbol and an element adapted to change appearance over time. This element is disposed so as to mask said symbol, the latter being rendered visible following a change in the visual appearance of said element.

The ageing member preferably includes:
a lower patch including said symbol;
an upper patch adapted to change appearance over time, disposed on top of said lower patch.

In accordance with another variant embodiment of the invention, the symbol may be inscribed directly on the windscreen wiper blade, notably by etching, printing or gluing.

In this case, the ageing member preferably includes a single patch adapted to change appearance over time, disposed substantially on top of said symbol.

The ageing member is preferably adapted to change appearance over time because of the effect of an exterior agent that may be a gas such as oxygen, a liquid such as water or radiation that may be particle radiation such as ultraviolet radiation.

The ageing member preferably includes an initially opaque photosensitive substance adapted to become transparent when it has absorbed a particular quantity of light.

The present invention also has for subject matter a windscreen wiper characterized in that it includes a windscreen wiper blade in accordance with the invention.

Other features and advantages of the present invention will become apparent in the light of the following examples and the appended figures, said examples and figures being provided by way of nonlimiting illustration only.

FIG. 1, already described, is a representation of a prior art windscreen wiper blade that includes an ageing member, the blade being articulated to an actuating arm of a windscreen wiper.

FIG. 2, already described, is a representation of the ageing member of the windscreen wiper blade represented in FIG. 1.

The windscreen wiper blade in accordance with the invention, which is intended to be articulated to an actuating arm of a windscreen wiper system, includes:
- a so-called ageing member adapted to change visual appearance over time; and
- at least one symbol 7 masked by the ageing member, the symbol 7 being rendered visible following a change in the visual appearance of the ageing member.

Figure 1:
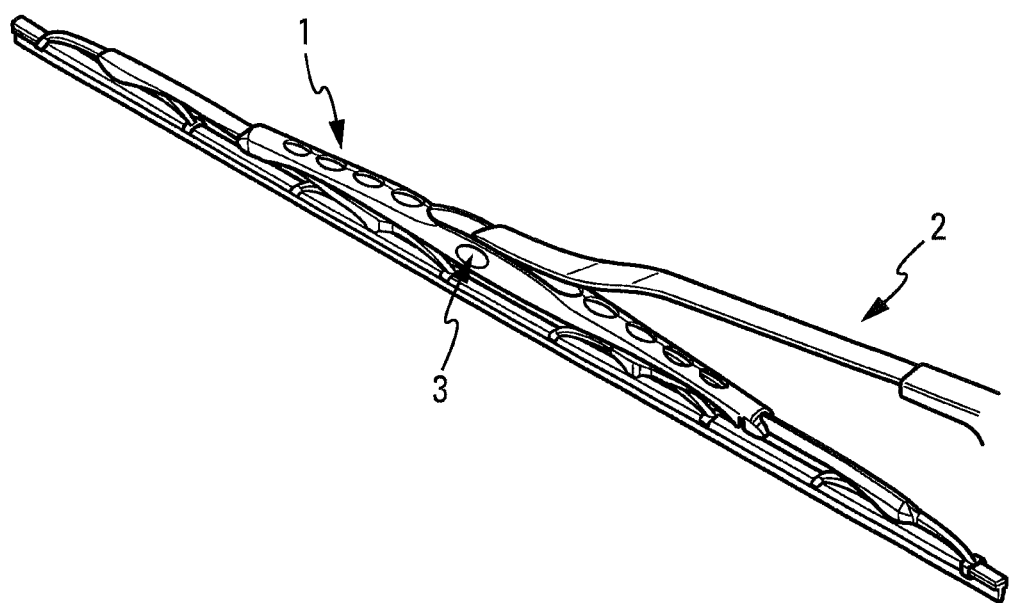
Figure 2:
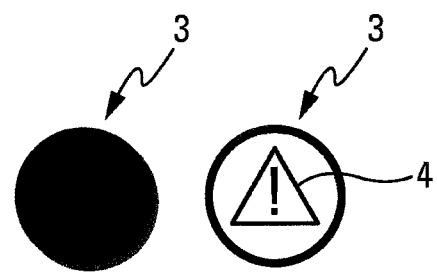
Figure 3:
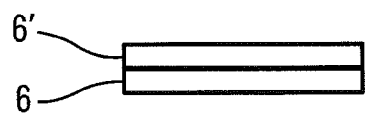
FIG. 3 is a diagrammatic reproduction, in cross section, of an ageing member of a blade in accordance with a variant embodiment of the invention.

The ageing member preferably includes said symbol 7. In this case, as shown in FIG. 3, the ageing member includes:
- a lower patch 6 including said symbol 7;
- an upper patch 6' adapted to change appearance over time, disposed on top of said lower patch 6.

Accordingly, when fitting the blade, the symbol 7 is not visible to the motorist, the initial appearance and the disposition of the upper patch 6' making it possible to mask the symbol 7.

The upper patch 6' is typically of opaque initial appearance and is adapted to become transparent because of the effect of an exterior agent such as a gas that may be oxygen, a liquid that may be water or radiation that may be particle radiation such as ultraviolet radiation.

For example, the upper patch 6' may include an initially opaque photosensitive substance adapted to become transparent when it has absorbed a particular quantity of light. The time necessary to absorb this particular quantity of light under normal conditions of use substantially corresponds to the average service life of the blade.

The upper patch 6' may change appearance gradually, a period of the service life of the blade corresponding to each significant change of appearance.

The invention is not limited to the embodiment described above. Still within the scope of the invention, the ageing member may include only one patch such as said upper patch 6', in which case the symbol 7 is inscribed directly on the windscreen wiper blade by etching, printing or gluing, the patch 6' being disposed in such a manner as to cover it.

The symbol 7 includes at least one type of elementary pattern 70 making it possible to code information relating to the blade in terms of the dimensions and/or the shape thereof and/or the relative arrangement between elementary patterns 70 of the same or different types.

Figure 4:
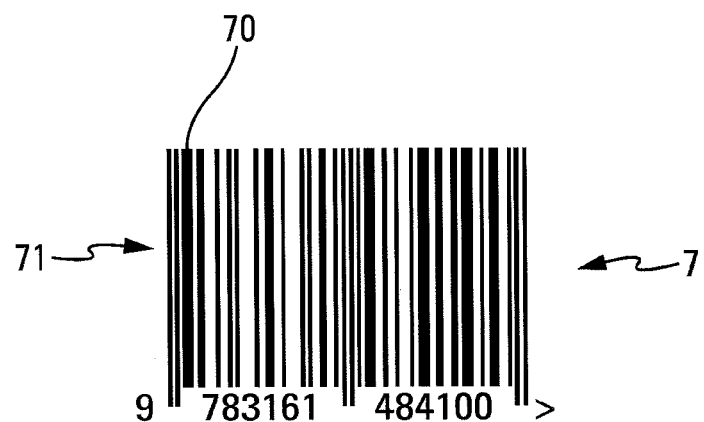
FIG. 4 is a representation of a symbol of a windscreen wiper blade in accordance with the invention consisting in a one-dimensional barcode.
Figure 5:
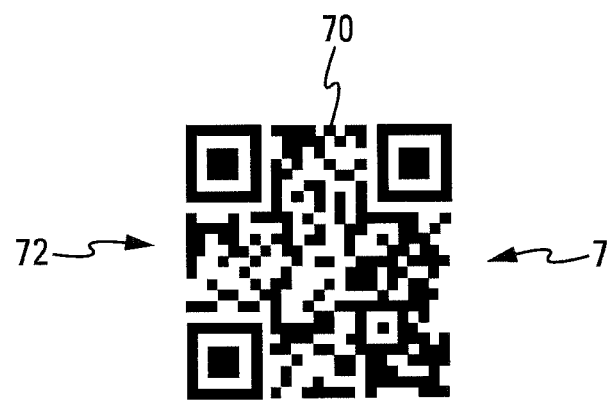
FIG. 5 is a representation of a symbol of a windscreen wiper blade in accordance with the invention consisting in a two-dimensional barcode.

The symbol 7 may therefore be chosen from barcodes that may notably be:
- One-dimensional (1D barcodes). As shown in FIG. 4, these codes are represented by a series of parallel lines of varying thickness. The symbol 71 may notably but not exclusively be a barcode such as a code 39, a code 93, a code 128, an EAN/UPC code, a two from five (⅖) code, a GS1 code or one of its variants such as a GS1-128, GS1 Databar, GS1 ITF-14 code. For example, the GTIN (Global Trade Item Number) of the windscreen wiper blade may be encoded in the form of an EAN 13 barcode.
- Two-dimensional (2D) barcodes. These codes are represented by diverse patterns such as dots, squares, rectangles, hexagons. The symbol 72 may therefore be a QR (Quick Response) type barcode, as shown in FIG. 5, consisting in black modules composed of rectangles, disposed in a white background square. The symbol 72 may notably but not exclusively be a barcode of the 16K code, codablock, PDF-417, DataMatrix, Maxi-Code type. The symbol 72 may also be a barcode of the "Bokode" type, sometimes considered a three-dimensional (3D) code, comprising a light-emitting diode, a mask and a lens.
- Composite barcodes. These barcodes are the result of combining at least one 1D code with a 2D code.

Said information is decoded by means of a decoding device including an electronic sensor, such as a barcode reader, a mobile telephone, a pocket terminal or a cyber camera.

For example, the device for decoding the information may notably but not exclusively include:
- a CCD (Charge-Coupled Device) reader including a CCD sensor and means for emitting a light beam such as a light-emitting diode;
- a laser reader that includes a phototransistor and a laser diode for generating a laser beam, this laser reader enabling remote reading of the symbol 7;
- a pencil type reader including a phototransistor and a light-emitting diode for generating a light beam.

The device for decoding the information also includes means for processing the electrical signal generated by said CCD sensor or by the phototransistor, this means for processing the signal making it possible to decode said information.

The information coded by the symbol 7 may notably but not exclusively include:
- the part number of the blade;
- how to mount and demount it;
- the points of sale of the replacement blade;
- an address of an Internet site providing information on the blade;
- trackability indications for the blade.

The invention claimed is:

1. A windscreen wiper blade comprising:
   at least one member adapted to change visual appearance over time; and
   at least one symbol hidden at least in part by said member, wherein the at least one symbol comprises at least one type of elementary pattern the dimensions and/or relative layout of which enable coding of information relating to the type and point of sale of the replacement blade.

2. The windscreen wiper blade as claimed in claim 1, wherein the symbol is rendered visible following a change in the visual appearance of said member.

3. The windscreen wiper blade as claimed in claim 1, wherein the symbol is chosen from barcodes.

4. The windscreen wiper blade as claimed in claim 3, wherein the barcode chosen as the symbol is chosen from the group consisting of: one-dimensional barcodes and two-dimensional barcodes.

5. The windscreen wiper blade as claimed in claim 1, wherein said member includes said symbol.

6. The windscreen wiper blade as claimed in claim 5, wherein said member comprises:
   a lower patch including said symbol;
   an upper patch adapted to change appearance over time, disposed on top of said lower patch.

7. The windscreen wiper blade as claimed in claim 1, wherein the symbol is inscribed directly on the windscreen wiper blade.

8. The windscreen wiper blade as claimed in claim 1, wherein said member is adapted to change appearance over time because of the effect of an exterior agent.

9. The windscreen wiper blade as claimed in claim 8, wherein the exterior agent is one selected from the group consisting of a gas, a liquid and radiation.

10. The windscreen wiper blade as claimed in claim 8, wherein said member includes an initially opaque photosensitive substance adapted to become transparent when it has absorbed a particular quantity of light.

11. A windscreen wiper comprising the windscreen wiper blade as claimed in claim 1.

* * * * *